US007655268B2

(12) United States Patent  
Appelqvist et al.

(10) Patent No.: US 7,655,268 B2
(45) Date of Patent: Feb. 2, 2010

(54) THICKENING AGENT AND PROCESS FOR THICKENING

(75) Inventors: Ingrid Anne Appelqvist, Bedford (GB); Jadwiga Malgorzata Bialek, Bedford (GB); Caroline Anne Watson, Bedford (GB)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 688 days.

(21) Appl. No.: 10/527,640

(22) PCT Filed: Aug. 28, 2003

(86) PCT No.: PCT/EP03/09583

§ 371 (c)(1),
(2), (4) Date: Mar. 14, 2005

(87) PCT Pub. No.: WO2004/023893

PCT Pub. Date: Mar. 25, 2004

(65) Prior Publication Data

US 2006/0051460 A1  Mar. 9, 2006

(30) Foreign Application Priority Data

Sep. 16, 2002  (EP) ................... 02256406

(51) Int. Cl.
*A23L 1/05* (2006.01)

(52) U.S. Cl. .................... 426/615; 426/50; 426/51; 426/573; 426/640

(58) Field of Classification Search ........... 426/615, 426/640, 589, 50, 51, 74, 620, 639, 658
See application file for complete search history.

(56) References Cited

U.S. PATENT DOCUMENTS

| 2,118,391 | A | 5/1938 | Caballero et al. |
| 2,582,396 | A | 1/1952 | Rooker |
| 3,183,103 | A | 5/1965 | Bundus et al. |
| 4,547,375 | A | 10/1985 | Mersfelder et al. |
| 4,931,321 | A | 6/1990 | Harra |
| 4,970,089 | A | 11/1990 | Jacobellis |

FOREIGN PATENT DOCUMENTS

| EP | 0 745 332 | 12/1996 |
| JP | 57/202257 | 11/1982 |
| WO | 96/11588 | 4/1996 |
| WO | 97/41741 | 11/1997 |
| WO | 99/65328 | 12/1999 |

OTHER PUBLICATIONS

European Search Report, EP 02 25 6406, dated Feb. 13, 2003, 3 pp.

*Primary Examiner*—Helen F Pratt
(74) *Attorney, Agent, or Firm*—Ellen Plotkin

(57) ABSTRACT

The invention relates to a process for thickening a product by adding a mixture of PME-deactivated and non-PME deactivated vegetables or fruits to the product, as well as to a product and a thickening agent comprising that mixture and their preparation.

1 Claim, 3 Drawing Sheets

THICKENING AGENT AND PROCESS FOR THICKENING

FIELD OF THE INVENTION

The present invention relates to a process for thickening liquid, pourable or squeezable products by preparing a vegetable or fruit mixture and adding it to the product to be thickened. Furthermore the invention relates to a thickening agent and a food product comprising a vegetable or fruit mixture.

BACKGROUND OF THE INVENTION

Particularly in the food industry there is a need to control consistency, taste, texture and mouthfeel of compositions. A broad range of thickeners is known in the art and conventionally employed for increasing the consistency of various food compositions. Well-known in this respect are starch and gellable biopolymers or gums. Examples of the latter group are gelatin, agar, carrageenans, pectins, alginates, xanthan, locust bean gum et cetera.

Each of the agents above has its own disadvantages limiting its use for certain applications:

The application of starch may result in a sticky mouthfeel and/or characteristic smell or flavour of starch, while biopoloymers or gums have a tendency to produce slimy or slightly gellified foodstuffs. Furthermore, most gums are rather expensive ingredients. The non-vegetable origin of biopolymers such as, for example, gelatin is another reason for making those biopolymers a less desirable food ingredient.

Vegetable purees that can be used to thicken food compositions have been described as alternatives for gellable biopolymers such as gums. JP 57/202257 discloses that soups, curry's, stews, sauces and the like may be thickened by the incorporation of smashed, steamed and homogenised vegetables, being rich in starch. The homogenisation is carried out, according to this invention, at a pressure between 30 to 150 bar. WO99/65328 describes a vegetable puree that is used to thicken food products, wherein the vegetable puree is prepared from homogenised vegetables being low in starch. Homogenisation is preferably carried out at 100 to 200 bar. WO96/11588 reports that tomato-based products of thick consistency can be obtained by subjecting a tomato paste to a high pressure shear field (i.e. high pressure homogenisation) and adding a source of pectinmethylesterase (e.g. raw vegetables or fruits) to the paste. These documents teach a processes for thickening a food product which overcome some of the problems described above but require some kind of pressure treatment (high pressure homogenisation) for obtaining the thickening effect.

U.S. Pat. No. 4,547,375 reports that hot break tomato pastes can be thickened if onions are added to the paste. The onions are reported to lose their gel-inducing (thickening properties) if they are pretreated at temperatures greater than 71° C.

SUMMARY OF THE INVENTION

Surprisingly, it has now been found that the addition of pectin methyl esterase deactivated (PME-deactivated) in combination with not-deactivated (non PME-deactivated) fruits or vegetables, for example a mixture of heat-treated and non-heat-treated fruits or vegetables, can be used to thicken products. The addition of such a mixture to liquid or pourable products shows a strong thickening effect whereas the addition of vegetables/fruits that are either PME-deactivated or non-PME-deactivated shows no or a much weaker thickening effect. The thickening effect of PME-deactivated/non-PME deactivated vegetable or fruit mixtures can be obtained without using costly pressure or high-pressure homogenisation treatment.

According to the present invention there is provided a process for thickening a liquid or pourable product comprising the steps of
i) preparing a first and a second portion of one or more PME-comprising fruits or vegetables;
ii) PME-deactivating the first portion;
iii) combining the first and the second portion in a weight ratio of 1:9 to 9:1 to form a fruit or vegetable mixture;
iv) incorporating the fruit or vegetable mixture in the product to be thickened, wherein the fruits or vegetables are comminuted at one or more of the steps i)-iii), and wherein the fruits are selected from cherries, edible berries, bananas, apples, pineapples, and citrus fruits such as for example lemons, limes, oranges, tangerines, grapefruits and mixtures thereof, and wherein the vegetables are selected from the group consisting of root vegetables, stem vegetables, leafstalk vegetables, bulb vegetables, immature flower vegetables, leaf vegetables, tuber vegetables, bud vegetables seed vegetables and mixtures thereof.

According to the present invention there is also provided a thickening agent comprising a fruit or vegetable mixture of two portions of PME-comprising fruits/vegetables said thickening agent being obtainable by the process above.

According to the present invention there is further provided a product comprising 0.5% to 95% by weight based on the product of the thickening agent above.

The present invention seeks to provide an alternative and improved fruit- or vegetable-based thickening agent and a cheap and/or easy process for thickening products which partially or completely replaces the need to use other thickeners such as starches or gums. Process and thickening agent according to the invention overcome one or more of the disadvantages described above. An advantage of the present invention is, that using the process or thickening agent described herein a thickening effect can be obtained without requiring costly high-pressure homogenisation treatment. Another advantage of the present invention is that food products can be thickened without the food products having to be pretreated (i.e. heat or pressure treated). A further advantage of the present invention is that the process and thickening agent of the invention can also be used to impart a smooth or pulpy texture on the product. Yet another advantage of the present invention is that the fruit or vegetable mixture provided herein does not adversely affect the flavour of a food product but rather adds, after being incorporated in the food product, a natural, fruity-or vegetable taste depending on the fruits or vegetables used in the preparation of the mixture.

Additionally, it has been found that, as another advantage of the present invention, the process or thickening agent provided herein may be used to provide a dry thickening agent that can easily be re-hydrated and which retains its thickening properties upon re-hydration. Furthermore, process and agent according to the invention can be used to reduce the perceived acidity of food products. This may allow the use of acids to maintain a low pH in the food composition, for example, to improve the microbiological stability of the food composition, without the food product being perceived as having the strongly acidic pH perceived as such by the consumer. This means a food product having incorporated an agent according to the invention may have a pH of 3.8 but it will be perceived by a consumer as less acidic than a food product having also a pH of 3.8 but not having incorporated an agent according to the invention. It is therefore also an aspect of the invention to provide a method of reducing the perceived acidity of a product by incorporating into that product 0.5 to 95% by weight based on the weight of the product of the thickening agent as described above.

DETAILED DESCRIPTION OF THE INVENTION

It has been observed that fruit/vegetable purees comprising only PME deactivated fruits/vegetables and purees comprising only non PME-deactivated fruits/vegetables do not have the same properties as a combination of those purees. Therefore, without wishing to be bound by any theory, it is believed that the properties of the fruit or vegetable mixtures described herein are due to the combination of deactivated pectin methyl esterase (PME), still active PME and particle-particle interactions of the comminuted fruits or vegetables.

Suitable vegetables according to the invention are root vegetables (this being vegetables whose edible parts are roots and include, for example, rutabagas, beets, carrots, celeriac, sweet potatoes, turnips, parsnips, swedes, parsley roots); stem vegetables (vegetables whose edible parts are the stems and include, for example, asparagus or kohlrabi); leafstalk vegetables (vegetables whose edible parts are the leafstalks and include, for example, celery, rhubarb, leek); leaf vegetables (vegetables whose edible parts are leaves and include, for example, cabbage, spinache, chive); bud vegetables (vegetables whose edible part are buds and include, for example, sprouts); immature flower vegetables including (vegetables whose edible parts are immature flowers), for example, cauliflower, broccoli, artichokes; tuber vegetables, (vegetables whose edible parts are tubers such as for example potatoes or taros), seed vegetables including peas and beans, and bulb vegetables (vegetables whose edible part are bulbs such as, for example, onions, garlic) or mixtures thereof.

Preferred vegetables according to the invention are root vegetables, stem vegetables, leafstalk vegetables, bulb vegetables, immature flower vegetables and/or mixtures thereof.

Suitable fruits according to the invention are citrus fruits, such as for example, lemons, limes, oranges, tangerines, grapefruits, citrons as well as berries, cherries, pineapples, apples, bananas and mixtures thereof. The term fruit is used herein as meaning the fleshy or ripened ovary of a plant surrounding the seed. Therefore, tomatoes and peppers are referred to herein as fruits and are not suitable according to the invention.

The fruits and/or vegetables may be used with their stalks, leaves, skin or seeds. Preferably the fruits or vegetables are used after the parts that are usually not eaten, such as skin, stalks, leaves, or seeds, have been removed.

A first portion of the fruits or vegetables is PME-deactivated. A fruit or vegetable is deactivated when it shows no measurable PME activity i.e. no consumption of NaOH in the assay as described in the experimental method section. Preferably, a fruit or vegetable is PME-deactivated as used herein when it shows a PME activity below and excluding 0.03 µmol $COO^-$/min/ml, measured as described under the method section herein. PME-deactivation can be achieved treating complete, preferably comminuted, fruits and/or vegetables with UV-, IR- or ultrasonic-irradiation, high pressure and/or heat.

A preferred method for the preparation PME-deactivated fruits or vegetables is a "hot break process". A hot break process as used herein means a process wherein the fruits and/or vegetables are heated and comminuted either during, after or prior to the heating step. Typically, the vegetables and fruits are submitted to a heat treatment of temperatures greater than 70° C., preferably greater than 75, more preferably greater than 85° C. Preferably the fruits/vegetables (or comminuted parts thereof) in a hot break process have reached a temperature of greater than 70° C., more preferably greater than 75° C. and most preferably greater than 85° C. but without substantial burning having taken place. In a hot break process, heating of the fruits or vegetables can be carried out, for example, in a water bath, in a microwave or by roasting, baking, frying, UV- or IR-irradiating. The fruits or vegetables can be heated in any suitable medium such as for example air, water, oil, at atmospheric, higher than atmospheric or under reduced pressure.

The second portion comprises fruits or vegetables that are not PME-deactivated. Fruits and/or vegetables are not PME-deactivated when they show a PME activity of greater than and including 0.03, preferably greater than and including 0.05 µmol $COO^-$/min/ml measured as described in the method section herein. Preferably, the fruits or vegetables of the second portion are prepared by a cold break process. A cold break process as used herein is a process wherein the fruits or vegetables are comminuted under conditions where the PME is not substantially deactivated. In a cold break process the fruits or vegetables are comminuted at temperatures not exceeding 70°, preferably not exceeding 50° C., more preferably not exceeding room temperature (25° C.). Preferably, in a cold break process the vegetables/fruits have not reached temperatures greater than 45° C., more preferably greater than 30° C.

Comminution of the fruits or vegetables can be achieved by, for example, slicing, crushing, cutting, chopping and macerating and can be carried out at any one of step i) to iii) or during several of those steps of the process. It is possible, for example, to comminute the fruit or vegetable portions before they are combined or after they have been combined. Several consecutive comminution steps may also be carried out. Preferably the fruits or vegetables of the first and second portion have been comminuted before they are combined. Comminution of the fruits or vegetables may be carried out with ordinary kitchen equipment such as kitchen knives, food processors or corresponding industrial equipment. Preferably the fruits and/or vegetables are comminuted to a particle size smaller than 5 cm, preferably smaller than 3 cm. More preferably the vegetables/fruits have a particle size between 50 and 0.2 mm and most preferably between 15 and 0.5 mm.

First and second portion of the fruits or vegetables can be prepared from different fruits or vegetables. For example, the first portion may be prepared from celery while the second portion may be prepared from onions. Preferably, first and second portion are prepared from the same species of fruits or vegetables, e.g. both portions are prepared from onions. First and second portions may also be prepared from more than one fruit or vegetable, for example, the first portion may be prepared from an onion/celery mixture while the second portion, may be prepared, for example, from a carrot/broccoli mixture. First and second portions are combined in a weight ratio of 1:9 to 9:1, preferably 2:8 to 8:2, more preferably 4:6 to 6:4 to form a fruit or vegetable mixture.

The mixture may comprise from 10% to 90%, preferably from 20% to 80% more preferably from 40% to 60% by weight based on the weight of the mixture of the first portion and from 90% to 10%, preferably from 80% to 20%, more preferably from 60% to 40% by weight of the second portion.

Combination of the two portions can be carried out by ordinary mixing or blending. Each portion as well as the combined portions may be homogenised, high-pressure homogenised, passed through a sieve, dried or used as obtained.

Homogenised is herein understood as to mean having a homogeneous appearance visible by the naked eye, as it can be achieved by, for example, blending, mixing, grinding, milling, passing through a sieve or combination thereof.

High-pressure homogenised is herein understood as to mean homogenised on a micro level, i.e. non visible to the naked eye, as it can be achieved by using colloid mills or high pressure homogenisers as known to the person skilled in the art of food processing.

The combined vegetable/fruit mixtures may comprise other ingredients such as herbs and spices, edible salts, antioxidants and/or preservatives. Preferably, the combined portions comprise from 1 to 10% by weight based on the weight of the combined portions of an edible salt. Suitable edible salts are, for example, alkaline metal, earth metal and ammonium chlorides, sulphate, citrate salts (such as for example NaCl, KCl, CaCl ammonium chloride).

The combined portions may be pasteurised or sterilised but preferably they are sterilised or pasteurised after thickening or gelation has occurred.

Depending on the weight ratio of first and second portion the properties of the resulting mixture, other than their thickening properties, vary. For example, the higher the weight ratio of the PME-deactivated portion of the mixture the smoother the texture of mixture and the sweeter its taste. If on the other hand the weight ratio of the second portion (the non PME-deactivated part of the mixture) is increased, the mixture gets a more particulate and pulpier texture. The suitable ratios may vary, depending on type and variety of the fruits or vegetables used.

The fruit or vegetable mixture comprising the first and the second portion may be incorporated into products to be thickened by any suitable means such as mixing, blending, or homogenising. The thickening agent may be incorporated in the product immediately after the thickening agent has been prepared or the thickening agent may be prepared and incubated prior to it being incorporated in the product. Incubation is preferably carried out for at least 10 minutes, more preferably for at least 20 minutes at a temperature above freezing point of the mixtures and below 70° C.

The mixture may be incorporated into a product during the process of preparing the food product or into a finished product, i.e. after the product has been prepared.

Preferably, when being incorporated into a product the product is kept at a temperature below 70° C. and preferably the product is kept at a temperature below 70° C. for at least 5, more preferably for at least 15 minutes below a temperature of 70° C. Usually, 0.5% to 80%, preferably 2% to 50%, more preferably 5% to 30% by weight of the fruit or vegetable mixture based on the weight of the product is incorporated into the product. The product may be heated prior, during or after the addition. Suitable products according to the invention are liquid, pourable or spoonable products. Although food products are preferred, personal care products such as, for example, body creams, bathing soaps or lotions, shampoos, face masks, soaps or their equivalent dried compositions are also suitable according to the invention. Suitable food products according to the invention include, for example, soups, sauces, dips, dressings, beverages or spreads. Non-frozen foods are preferred in this context. Preferred food products are dried food products including for example dried meals, dried nutritional compositions, dried sauces, dried soups, dried drinks or bouillon cubes. Preferably, the products according to the invention are emulsions, with oil-in-water emulsions being most preferred.

Also claimed herein is a thickening agent based on comminuted fruits or vegetables obtainable by a process as described above. The process may comprise one or more drying steps. The thickening agent according to the invention may further comprise herbs and spices, flavours, colourants, antioxidants, vitamins, salts, preferably sodium or potassium chloride, and mixtures thereof.

The thickening agent may be a puree, a paste or a powder. It may be dry or semi-dry. The agent according to the invention may be dried by any suitable drying method including, for example, freeze-drying, air-drying, sun-drying or spray-drying or by physical separation such as, e.g., centrifugation. The dry or semi-dry thickening agent according to the invention may be a mixture of particles, a powder, a pellet, a mixture of granules or a cube. Semi-dry is herein understood to have a water content of less than 50% by weight based on the weight of the thickening agent. Dry is herein understood to have a water content of less than 25% more preferably less than 10% by weight based on the weight of the thickening agent.

The thickening agent may have a water activity of from 0.01 to 0.45. The thickening agent according to the invention may be used to thicken or control the Theological properties of compositions, preferably food compositions.

The agent according to the invention may be used to impart a smooth or pulpy texture or to reduce the perceived acidity of food compositions.

Also claimed is a method for reducing the perceived acidity of a product by incorporating into that product 0.5 to 95% by weight based on the weight of the product of the thickening agent according to any one of claims 7 to 9.

Also claimed is a product comprising 0.5% to 95%, preferably 2% to 65%, more preferably 5% to 35% by weight of the thickening agent based on the weight of the product. The product according to the invention may further comprise from 0.5% to 50% by weight, preferably 1% to 30%, more preferably from 5 to 20% by weight based on the weight of the product of one or more edible salts. Preferred edible salts are sodium chloride or potassium chloride. The product may further comprise from 0.1 to 10% by weight based on the weight of the product of emulsifiers. Suitable products according to the invention are as already described above.

The invention is further illustrated by way of examples.

ABBREVIATIONS

'Veg' denotes: vegetable
'HB' and 'hb' denote: hot break, 'CB' and 'cb' denote: cold break
'PME' stands for pectin methyl esterase
A number in combination with HB,hb,CB,cb denotes the weight percentages of the HB/CB mixtures. For example 40CB/60HB onion denotes an onion mixture comprising 40% wt of cold break onions and 60% wt of hot break onions. The weight percentages are based on the weight of the mixture unless indicated otherwise.

DESCRIPTION OF THE FIGURES

FIG. 1 shows the results of example 6 (Stevens values of various onion purees). The Y-axis indicates the Stevens value in g. The X-axis indicates the composition of the onion purees used.

FIG. 2 shows the results of example 7 (Stevens values of various carrot, celery, celeriac and onion purees). The Y-axis indicates the Stevens value in g. The X-axis indicates the composition of the puree used. 'Veg' stands for vegetable and refers to carrots, celery, or celeriac respectively.

FIG. 3 shows the results of example 8 (changes in viscosity of a model composition after the addition of a 60HB/40CB onion puree (left column) and after the addition of a 100CB onion puree (right column). The Y-axis indicates the viscosity in Pa·s.

FIG. 4 shows the results of example 9 (elastic modulus of freeze-dried onion purees). The Y-axis indicates the elastic modulus in Pa and the X-axis the time passed upon the addition of water in minutes.

FIG. 5 shows the results of example 10 (elastic modulus of various orange purees). The Y-axis indicates the Elastic Modulus in Pa and the X-axis indicates the frequency in Hz. CB indicates a 100% cold break orange puree, HB indicates a 100% hot break orange puree and 40CB:60HB indicates a puree of 40% by weight cold break oranges and 60% by weight of hot break oranges.

FIG. 6 shows the results of example 11 (Stevens Values of various banana purees). The Y-axis indicates the Stevens Value in g and the X-axis indicates the composition of the banana purees.

MEASUREMENT OF VISCOSITY

Figure 1:
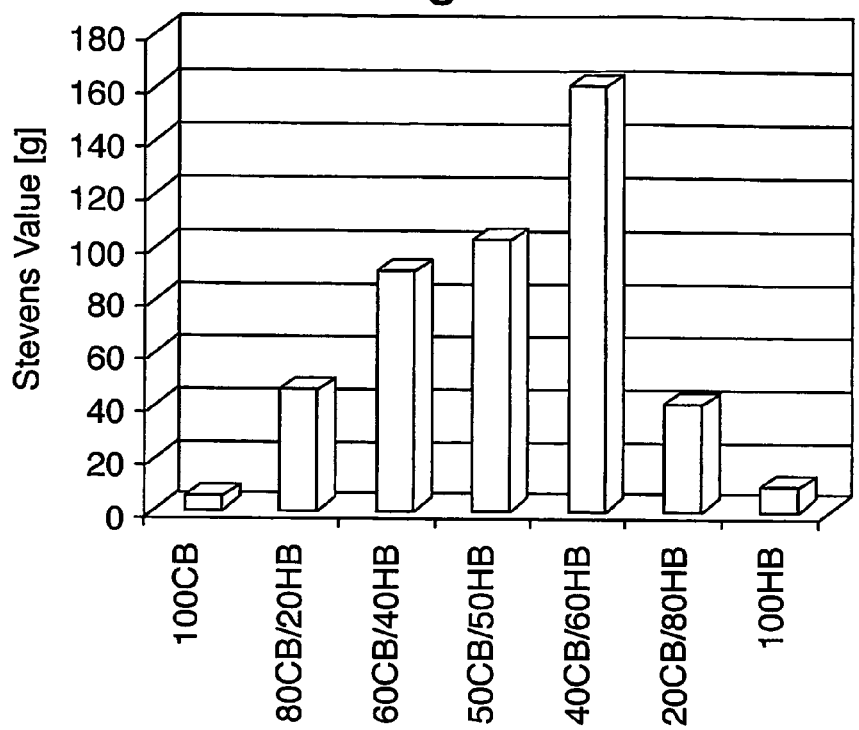
FIG. 1.

Viscosity measurements were carried out at 20° C. using a Physica Rheometer, Rheolab MC-1,Z-3 cup and bob geometry was used. The samples were equilibrated at the measuring temperature using a water bath prior to introduction to the measuring head. Flow curves conditions for all samples were as follows:

a) Ascending shear rate sweep 0-600 reciprocal seconds over a 3 minutes period
b) Descending shear rate sweep from 600-0 reciprocal seconds over a 3 minute period The viscosity in Pa s at 50 reciprocal seconds was determined from the upward flow curve.

Time Sweep Measurements:

Small deformation rheology: 2 g of puree were placed between parallel plates of 4 cm diameter on Carrimed. Time sweep measurements were made at 1 Pa stress at 30° C. unless stated otherwise. The frequency used was 1 Hz unless stated otherwise. Elastic modulus parameter were used for comparison. All samples were sealed with mineral oil to avoid desiccation or water exchange.

Measurement of Stevens Values:

The maximum penetration force was measured by an LFRA Stevens Analyser. The distance of penetration was 10 mm, the speed 1 mm/s and a gel probe of 10 mm diameter was used.

Measurements of PME Activity:

The fruits/vegetable extract is prepared by chopping and blending the fruits/vegetables in a Kenwood Food Processor in chilled 1M sodium chloride solution (1 ml NaCl solution per 1 g vegetable/fruit) for 20 minutes at top speed. The mixture is stirred using an overhead stirrer for 30 minutes at 4° C., after which the mixture is strained through a Miracloth. The collected liquid is centrifuged at 20° C. for 30 minutes at 13,000 rpm. The supernatant is stored at −20° C. prior to use.

A 1% w/v pectin standard solution is prepared by slowly adding pectin (Sigma apple pectin, DE 60) to a 0.2M sodium chloride solution and vortex mix until full dissolution is achieved. The solution is then brought to pH 6.0 using a 1M sodium hydroxide solution.

The PME activity of the vegetable/fruit extract is measured by monitoring the consumption of 0.01M NaOH to maintain pH 6.0 in a pH stat connected to an autotritor (Radiometer) upon addition of 1 ml a vegetable/fruit extract to 19 ml of a 1% w/v pectin standard at 30° C. From the amount of NaOH consumed over a period of 15 minutes the PME activity is expressed as µmol COO−/ml/min.

EXAMPLE 1

Preparation of PME-deactivated Onions, Carrots, Celery, Celleriac (First Portion) by a Hot Break Process The vegetables were peeled if necessary, cut in halves, placed into a Pyrex dish and covered with cling film. The vegetable halves were then heated in a Merrychef 1925 Watts microwave for 1.5 minute. The temperature of the vegetables was 90° C. on the exit from the microwave as measured by a thermocouple. The weights before and after microwave heating were recorded. The heated vegetables were transferred into a plastic beaker.

Deionised water was added to make up for the evaporative losses. The material was then placed in a Kenwood food processor, maximum setting for 10 minutes to produce a hot break onion puree. The Brix value of the puree obtained was between 5 and 15°.

EXAMPLE 2

Preparation of Non PME-deactivated Onions, Carrots, Celery and Celeriac (Second Portion According to the Invention) by a Cold Break Process The vegetables were peeled if necessary, coarsely chopped, placed into a pyrex dish and covered with cling film. The chopped vegetables were then heated in a Merrychef 1925 Watts microwave for 30 seconds. The temperature of the vegetables was 40° C. on the exit from microwave as measured by a thermocouple. The vegetables were transferred into a plastic beaker. The process was repeated until approximately 1000 g of material had been produced. A 1% w/w NaCl solution was added to the rather dry vegetables carrots and celery in an amount of 1 ml solution per 1 g vegetable material. The vegetables were then placed in a Kenwood food processor, maximum setting for 10 minutes to make a cold break onion, carrot, celery or celeriac puree. The Brix value of the purees was between 5 and 15°.

EXAMPLE 3

Preparation of a Vegetable Mixture Comprising PME-deactivated and Non-deactivated Onions The PME deactivated and non-deactivated HB and CB onions obtained as described above were mixed together in the desired weight ratios and mixed by hand to form a homogeneous mixture. The mixture was stored at 5° C.

EXAMPLE 4

Preparation of Vegetable Mixtures of HB and CB Carrots, Celery and Celeriac

Mixtures of the HB and CB vegetables as described in example 2 were combined in the desired weight ratios as described in example 3. The resulting purees had Brix values between 5° and 15°.

EXAMPLE 5

Preparation of HB/CB Banana and HB/CB Orange Purees

A first potion of bananas was prepared by peeling the bananas, chopping them into approximately 5 mm rings and place them into a Pyrex dish, which was then covered with cling film. The banana pieces were PME-deactivated by heating them in a Merrychef 1925 Watt microwave oven for 1 minute. The temperature of the banana pieces was about 90° C. on exit from the microwave oven. The weight of the banana pieces was recorded before and after the microwave step and evaporative losses of water were adjusted by adding deionised water. The banana material was then placed in a Kenwood food processor at maximum setting for three minutes. The Brix value of the resulting hot break banana puree was 24°.

The second portion was prepared by peeling bananas, chopping them into 5 mm rings and placing the rings for three minutes in a Kenwood food processor at maximum setting for 3 minutes. The so obtained cold break banana puree had a Brix value of 23°. The two banana portions were combined in the desired weight ratio and homogenised by mixing.

The HB/CB orange mixtures were prepared as described above for the banana mixtures apart from the oranges being cut into rings but into 5 mm pieces after having been peeled. The Brix values of the orange purees were around 24°.

EXAMPLE 6

Increased Thickness of CB/HB Onion Purees

Example 6 shows the increased thickness of an onion puree, comprising a first portion of PME-deactivated (hot break, HB) and a second portion of non-PME deactivated (cold break, CB) vegetables compared to onion purees comprising only PME-deactivated (hot break, HB) or non PME-deactivated (cold break, CB) onions. HB, CB and HB/CB onion purees of different HB to CB weight ratio as indicated in FIG. 1 were prepared as described above and stored overnight in a fridge at 5° C. The next day, the thickness of the compositions was measured as Stevens values. The results are shown in FIG. 1.

EXAMPLE 7

Increased Thickness of HB/CB Vegetable Purees

Example 7 shows the increased thickness of various vegetable mixtures comprising a first portion of PME-deactivated (hot break, HB) vegetables and a second portion of non-PME deactivated (cold break, CB) vegetables compared to vegetable purees comprising only PME-deactivated (hot break, HB) or non PME-deactivated (cold break, CB) vegetables.

Figure 2:
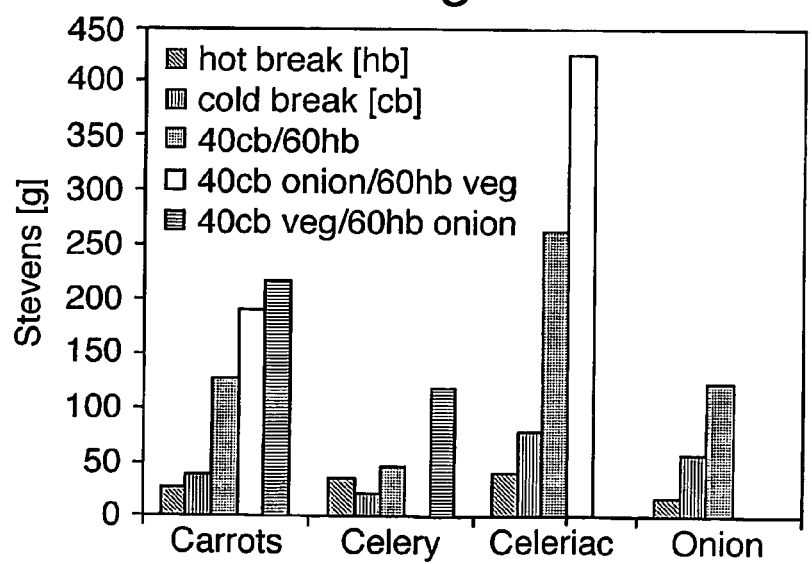
FIG. 2.

HB, CB and HB/CB mixtures from carrots, celery and celeriac having different weight ratios of PME-deactivated and non PME-deactivated vegetables as indicated in FIG. 2 were prepared in the same way as described for the onions. The consistency of the purees is indicated by the Stevens value. The results are shown in FIG. 2.

EXAMPLE 8

Thickening of Model Compositions

Figure 3:
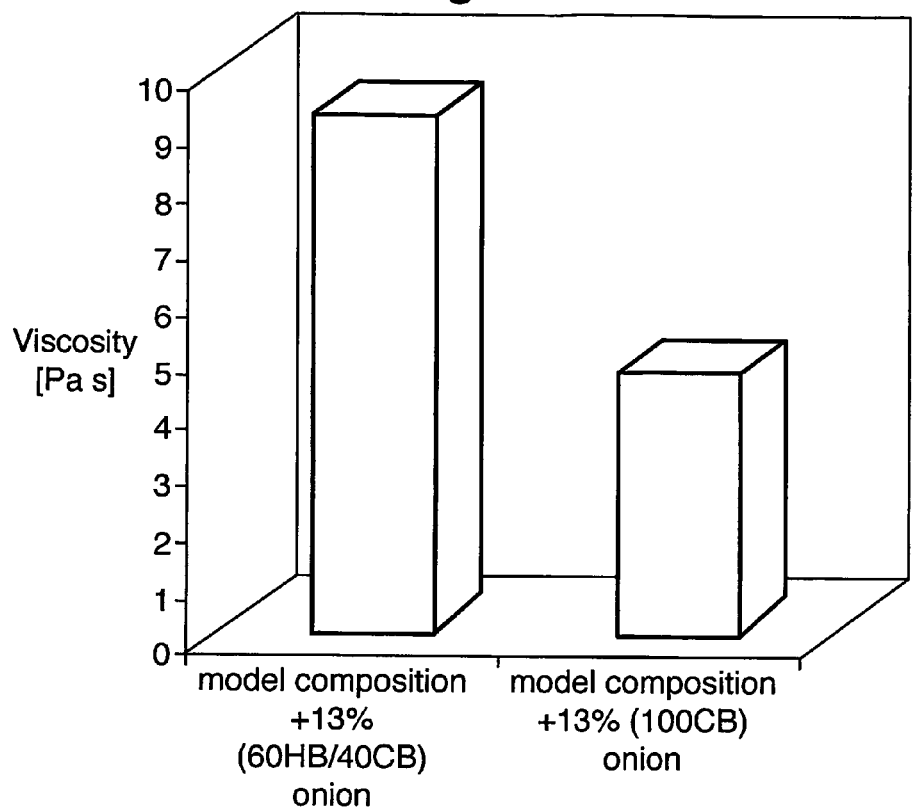
FIG. 3.

Example 8 shows the thickening properties of an onion mixture according to the invention comprising PME-deactivated (hot break, HB) onions and non PME-deactivated (cold break, CB) onions compared with an onion puree comprising cold break onions only. Two edible model compositions were prepared by mixing the ingredients listed in table 1 and stirring. To one of the model compositions 11% wt. (based on the weight of the model composition) of a 40CB/60HB onion mixture was added under stirring. To the other model composition 11% wt. (based on the weight of the model composition) of a cold break onion (100CB) mixture was added under stirring. The viscosity of both mixtures was measured after 24 hours storage at 25° C. The results are shown in FIG. 3.

TABLE 1

Ingredients of the model composition

| Ingredients | % weight |
|---|---|
| Sunflower oil | 10.00 |
| Xanthan gum | 0.30 |
| NaCl | 0.40 |
| Sucrose | 5.10 |
| Egg yolk | 1.00 |
| Starch | 1.20 |
| water | 82.00 |

EXAMPLE 9

Rehydration of Freeze-dried Purees

Figure 4:
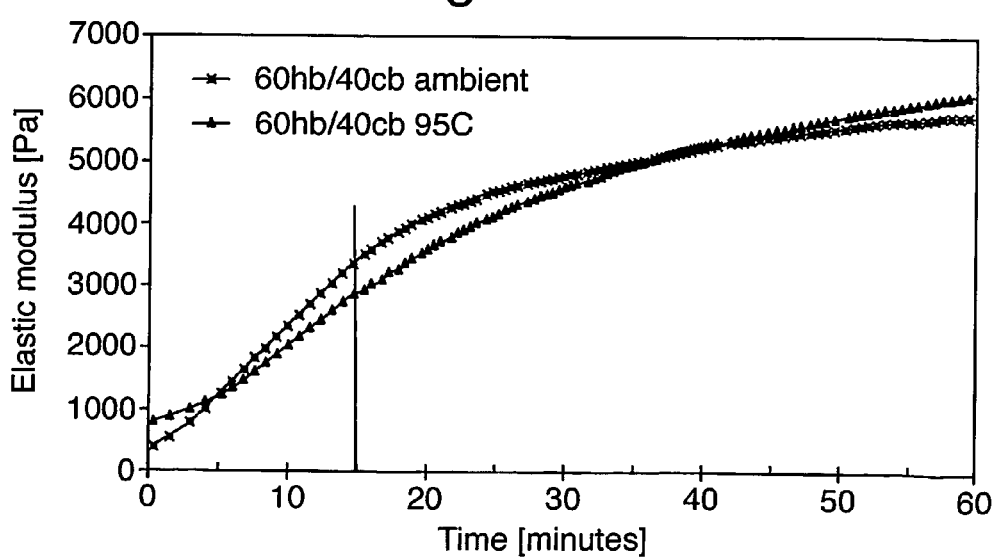
FIG. 4.

Example 9 shows the thickening of a freeze-dried 60HB/40CB onion mixture according to the invention after rehydration with room temperature water and with water near boiling point (95° C.). The onion mixture was frozen in an acetone-solid $CO_2$ mixture and then freeze dried in a Virtis Freezemobile 25EL freeze-drier. Room temperature water and 95° C. water was poured over aliquots of the freeze-dried onion mixture and the elastic moduli were measured by time sweep experiments. The results are shown in FIG. 4.

EXAMPLE 10

HB/CB Orange Purees

Figure 5:
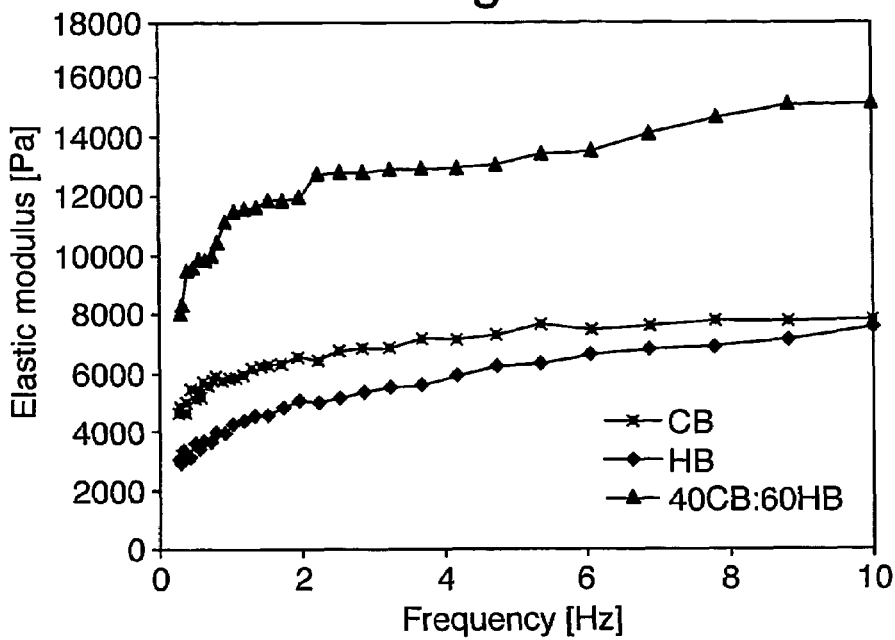
FIG. 5.

Orange mixtures of various compositions (HB only, CB only and 40CB/60HB) were prepared as described in the methods section and time sweep measurements were performed and the Elastic moduli measured. The results are shown in FIG. 5 and as can be seen there the (40CB/60HB)-orange mixture showed much higher elastic moduli than the HB or CB orange mixtures.

EXAMPLE 11

HB/CB Banana Purees

Figure 6:
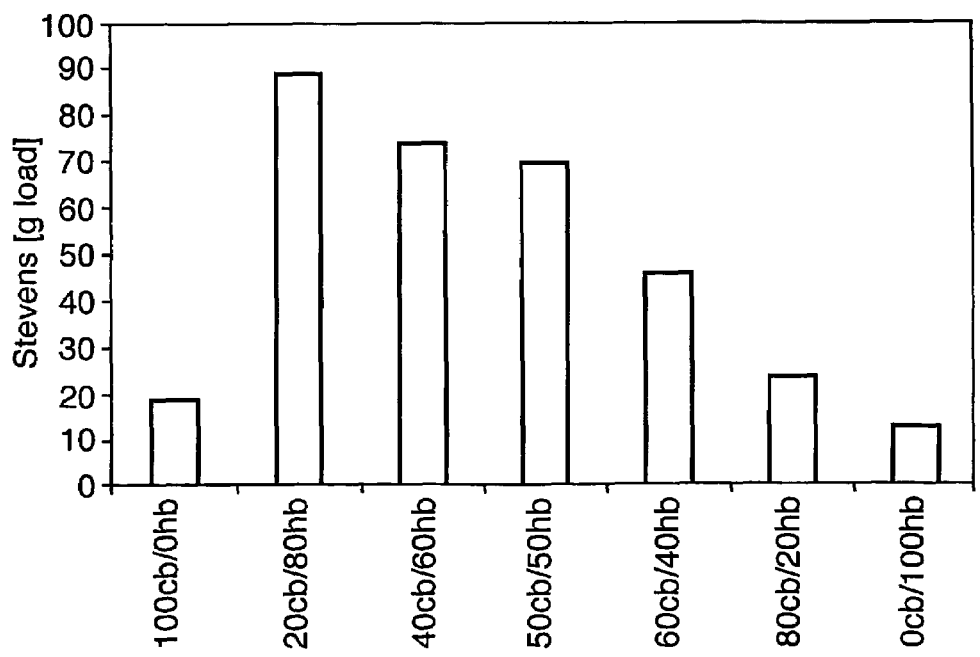
FIG. 6.

Banana mixtures of various compositions as indicated in FIG. 6 were prepared as described in the methods section and their Stevens values were measured. The results are shown in FIG. 6 and demonstrate the increased consistency of hot break/cold break purees compared to hot break only or cold break only purees.

The invention claimed is:

1. A process for thickening a liquid or pourable product consisting essentially of the steps of
   i) preparing a first and a second portion of one or more PME-comprising fruits or vegetables; wherein the first and the second portion are from the same vegetable or fruit species; wherein the fruits are selected from bananas, apples, oranges, pineapples, edible berries, cherries or mixtures thereof and wherein the vegetables are selected from the group consisting of onions, carrots, celery, celeriac, and mixtures thereof;
   ii) PME-deactivating the first portion;
   iii) combining the first and the second portion in a weight ratio of about 2:8 to about 8:2 to form a fruit or vegetable mixture; wherein the fruits or vegetables are comminuted at one or more of steps i)-iii);
   iv) drying the fruit or vegetable mixture to form a dried fruit or vegetable mixture;
   v) incorporating the dried fruit or vegetable mixture in the product to be thickened.

* * * * *